US012785868B2

(12) United States Patent
Huang

(10) Patent No.: US 12,785,868 B2
(45) Date of Patent: Nov. 3, 2026

(54) ACCESS POINT, STATION, AND WIRELESS COMMUNICATION METHOD

(71) Applicant: GUANGDONG OPPO MOBILE TELECOMMUNICATIONS CORP., LTD., Dongguan (CN)

(72) Inventor: Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 126 days.

(21) Appl. No.: 18/825,529

(22) Filed: Sep. 5, 2024

(65) Prior Publication Data

US 2024/0430049 A1 Dec. 26, 2024

Related U.S. Application Data

(63) Continuation of application No. PCT/CN2022/080443, filed on Mar. 11, 2022.

(51) Int. Cl.
*H04L 5/00* (2006.01)
*H04W 72/21* (2023.01)

(52) U.S. Cl.
CPC ........... *H04L 5/0007* (2013.01); *H04W 72/21* (2023.01)

(58) Field of Classification Search
CPC ... H04L 5/0007; H04L 5/0042; H04L 5/0094; H04W 72/21; H04W 84/12
See application file for complete search history.

(56) References Cited

U.S. PATENT DOCUMENTS

| | | | | |
|---|---|---|---|---|
| 2021/0281384 | A1* | 9/2021 | Hu | H04B 7/0452 |
| 2021/0368390 | A1* | 11/2021 | Kim | H04W 28/06 |
| 2022/0052809 | A1 | 2/2022 | Liu et al. | |
| 2022/0353025 | A1* | 11/2022 | Gan | H04L 5/0007 |

FOREIGN PATENT DOCUMENTS

| | | | |
|---|---|---|---|
| CN | 113347717 | A | 9/2021 |
| CN | 113825230 | A | 12/2021 |
| CN | 113891460 | A | 1/2022 |
| EP | 3876470 | A1 | 9/2021 |

(Continued)

OTHER PUBLICATIONS

PCT International Search Report for International Application No. PCT/CN2022/080443 dated Nov. 30, 2022.

(Continued)

*Primary Examiner* — Sung S Ahn

(74) *Attorney, Agent, or Firm* — Sheppard, Mullin, Richter & Hampton LLP

(57) ABSTRACT

An access point (AP), a station (STA), and a wireless communication method are disclosed. The wireless communication method includes determining, by the AP or the STA, an orthogonal frequency division multiple access (OFDMA) physical layer protocol data unit (PPDU) transmission including an OFDMA PPDU. A data field of the OFDMA PPDU includes a physical resource unit (RU) allocation mode, a logical RU allocation mode, and/or a hybrid RU allocation mode. An RU allocation mode subfield associated with the OFDMA PPDU indicates that one of the physical RU allocation mode, the logical RU allocation mode, and the hybrid RU allocation mode is used for the OFDMA PPDU.

18 Claims, 10 Drawing Sheets

(56) References Cited

FOREIGN PATENT DOCUMENTS

| | | | |
|---|---|---|---|
| WO | 2021183608 | A1 | 9/2021 |
| WO | 2021183627 | A1 | 9/2021 |

OTHER PUBLICATIONS

PCT Written opinion for International Application No. PCT/CN2022/080443 dated Nov. 30, 2022.
"Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", 802.11 Working Group of the LAN/MAN Standards Committee of the IEEE Computer Society, IEEE P802.11be™/D1.4 dated Jan. 4, 2022.
EP Supplementary European Search Report for European Application No. 22930347.4 dated Jul. 10, 2025.
EP Communication pursuant to Article 94(3) EPC for European Application No. 22930347.4 dated Apr. 13, 2026.

* cited by examiner

| | Frame Control | Duration | RA | TA | Common Info | User Info List | Padding | FCS |
|---|---|---|---|---|---|---|---|---|
| Octets: | 2 | 2 | 6 | 6 | 8 | Variable | Variable | 4 |

FIG. 8A

| | B0 B3 | B4 B15 | B16 | B17 | B18 B19 | B20 B21 | B22 | B23 B25 |
|---|---|---|---|---|---|---|---|---|
| | Trigger Type | UL Length | More TF | CS Required | UL BW | GI And HE/EHT-LTF Type/Triggered TXOP Sharing Mode | Reserved | Number Of HE/EHT-LTF Symbols |
| Bits: | 4 | 12 | 1 | 1 | 2 | 2 | 1 | 3 |

| | B26 | B27 | B28 B33 | B34 B35 | B36 | B37 B52 | B53 | B54 | B55 |
|---|---|---|---|---|---|---|---|---|---|
| | Reserved | LDPC Extra Symbol Segment | AP TX Power | Pre-FEC Padding Factor | PE Disambiguity | UL Spatial Reuse | Reserved | HE/EHT P160 | Special User Info Field Flag |
| Bits: | 1 | 1 | 6 | 2 | 1 | 16 | 1 | 1 | 1 |

| | B56 B57 | B58 B60 | B61 B62 | B63 | |
|---|---|---|---|---|---|
| | RU Allocation Mode | Hybrid RU Allocation Pattern | EHT Reserved | Reserved | Trigger Dependent Common Info |
| Bits: | 2 | 3 | 2 | 1 | variable |

FIG. 8B

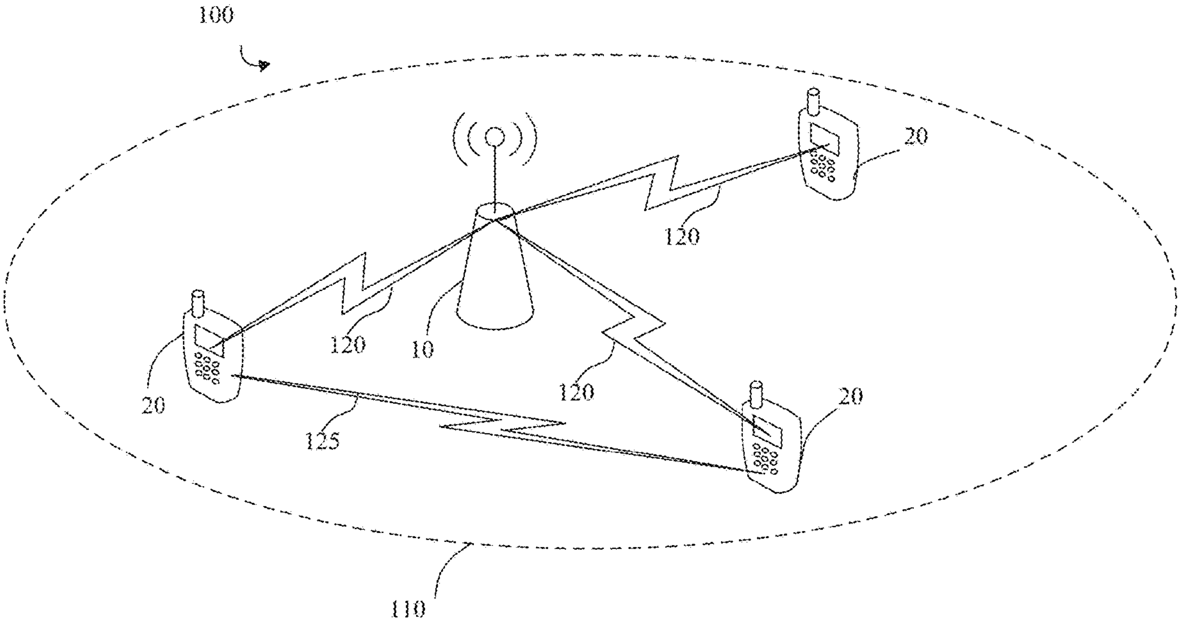

FIG. 9

ACCESS POINT, STATION, AND WIRELESS COMMUNICATION METHOD

CROSS-REFERENCE TO RELATED APPLICATIONS

This application is a continuation of International Application No. PCT/CN2022/080443, filed on Mar. 11, 2022, the disclosure of which is hereby incorporated by reference in its entirety.

TECHNICAL FIELD

The present disclosure relates to the field of communication systems, and more particularly, to an access point (AP), a station (STA), and a wireless communication method, which can provide a good communication performance and/or provide high reliability.

BACKGROUND

Communication systems such as wireless communication systems are widely deployed to provide various types of communication content such as voice, video, packet data, messaging, broadcast, and so on. These communication systems may be multiple-access systems capable of supporting communication with multiple users by sharing available system resources (such as, time, frequency, and power). A wireless network, for example a wireless local area network (WLAN), such as a Wi-Fi (institute of electrical and electronics engineer (IEEE) 802.11) network may include an access point (AP) that may communicate with one or more stations (STAs) or mobile devices. The WLAN enables a user to wirelessly access an internet based on radio frequency technology in a home, an office, or a specific service area using a portable terminal such as a personal digital assistant (PDA), a laptop computer, a portable multimedia player (PMP), a smartphone, etc. The AP may be coupled to a network, such as the internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink may refer to a communication link from the AP to the STA, and the uplink may refer to a communication link from the STA to the AP.

IEEE 802.11 TGbe is developing a new IEEE 802.11 amendment which defines extremely high throughput (EHT) physical layer (PHY) and medium access control (MAC) layers capable of supporting a maximum throughput of at least 30 Gbps. To this end, it has been proposed to increase maximum channel bandwidth to 320 MHz and allow a resource unit (RU) or multiple resource unit (MRU) to be allocated to a single STA in an EHT PPDU. However, it is an open issue to allocate RU/MRUs in an EHT PPDU to STAs in an efficient manner in order to maximize system throughput.

Therefore, there is a need for an access point (AP), a station (STA), and a wireless communication method, which can solve issues in the prior art, improve frequency diversity gain, reduce power consumption, achieve extremely high throughput (EHT), provide good communication performance, and/or provide high reliability.

SUMMARY

An object of the present disclosure is to propose an access point (AP), a station (STA), and a wireless communication method.

In a first aspect of the present disclosure, a wireless communication method by an AP comprises determining, by the AP, an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU.

In a second aspect of the present disclosure, a wireless communication method by a STA comprises determining, by the STA, an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU.

In a third aspect of the present disclosure, an AP comprises a determination unit configured to determine an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU.

In a fourth aspect of the present disclosure, a STA comprises a determination unit configured to determine an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU.

In a fifth aspect of the present disclosure, an AP comprises a memory, a transceiver, and a processor coupled to the memory and the transceiver. The AP is configured to perform the above method.

In a sixth aspect of the present disclosure, a STA comprises a memory, a transceiver, and a processor coupled to the memory and the transceiver. The STA is configured to perform the above method.

In a seventh aspect of the present disclosure, a non-transitory machine-readable storage medium has stored thereon instructions that, when executed by a computer, cause the computer to perform the above method.

In an eighth aspect of the present disclosure, a chip includes a processor, configured to call and run a computer program stored in a memory, to cause a device in which the chip is installed to execute the above method.

In a ninth aspect of the present disclosure, a computer readable storage medium, in which a computer program is stored, causes a computer to execute the above method.

In a tenth aspect of the present disclosure, a computer program product includes a computer program, and the computer program causes a computer to execute the above method.

In an eleventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 8A is a schematic diagram illustrating a format of a trigger frame for soliciting a TB PPDU transmission according to an embodiment of the present disclosure.

FIG. 8B is a schematic diagram illustrating an example format of an EHT variant common information field according to an embodiment of the present disclosure.

FIG. 9 is a schematic diagram illustrating an example of a wireless communications system according to an embodiment of the present disclosure.

DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

TABLE 1

| Abbreviation | Full name |
|---|---|
| IEEE | Institute of Electrical and Electronics Engineer |
| WLAN | Wireless local area network |
| BSS | Basic service set |
| AP | Access point |
| STA | Station |
| PHY | Physical layer |
| MAC | Medium access control |
| PPDU | PHY protocol data unit |
| HT | High throughput |
| HE | High efficiency |
| EHT | Extremely high throughput |
| TXOP | Transmission opportunity |
| OFDMA | Orthogonal frequency division multiple access |
| TB | Trigger based |
| L-LTF | Non-HT Long Training field |
| L-STF | Non-HT Short Training field |
| L-SIG | Non-HT SIGNAL field |
| RL-SIG | Repeated L-SIG field |
| EHT-SIG | EHT SIGNAL field |
| U-SIG | Universal SIGNAL field |
| EHT-STF | EHT Short Training field |
| EHT-LTF | EHT Long Training field |
| PE | Packet Extension field |
| BW | Bandwidth |
| GI | Guard interval |
| RU | Resource unit |
| MRU | Multiple resource unit |
| SIFS | Short interframe spacing |
| MCS | Modulation and coding scheme |
| UL | Uplink |
| MU | Multi-user |

Figure 1A:
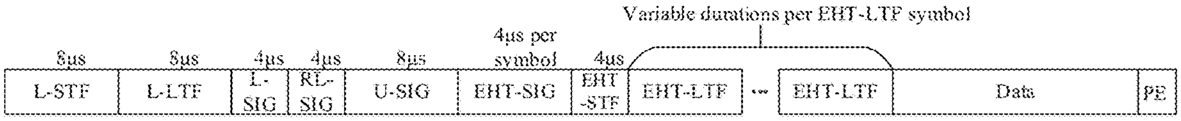
FIG. 1A is a schematic diagram illustrating an example EHT MU PPDU format according to an embodiment of the present disclosure.
Figure 1B:
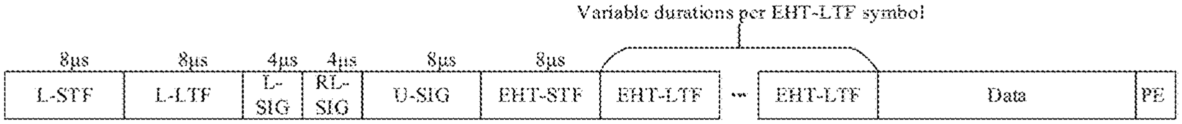
FIG. 1B is a schematic diagram illustrating an example EHT TB PPDU format according to an embodiment of the present disclosure.

EHT PPDU has two formats: EHT MU PPDU and EHT TB PPDU. FIG. 1A illustrates an example EHT MU PPDU format according to an embodiment of the present disclosure. FIG. 1B illustrates an example EHT TB PPDU format according to an embodiment of the present disclosure. The EHT MU PPDU format as illustrated in FIG. 1A is used for transmission to one or more users if the EHT MU PPDU is not a response of a trigger frame. In an EHT MU PPDU, L-STF, L-LTF, L-SIG, RL-SIG, U-SIG, and EHT-SIG are called pre-EHT modulated fields while EHT-STF, EHT-LTF, data filed, and PE are called EHT modulated fields. The EHT TB PPDU format as illustrated in FIG. 1B is used for a transmission that is a response to a trigger frame from an AP.

In an EHT TB PPDU, L-STF, L-LTF, L-SIG, RL-SIG, and U-SIG are called pre-EHT modulated fields while EHT-STF, EHT-LTF, data field, and PE are called EHT modulated fields. The duration of the EHT-STF in the EHT TB PPDU is twice the duration of the EHT-STF in the EHT MU PPDU. For an EHT PPDU, each EHT-LTF symbol has the same GI duration as each data symbol, which is 0.8 μs, 1.6 μs, or 3.2 μs. The EHT-LTF comprises three types: 1× EHT-LTF, 2× EHT-LTF, and 4× EHT-LTF. The duration of each 1× EHT-LTF, 2× EHT-LTF, or 4× EHT-LTF symbol without GI is 3.2 μs, 6.4 μs, or 12.8 μs. Each data symbol without GI is 12.8 μs.

RUs with equal to or more than 242 tones are defined as large size Rus, and RUs with less than 242 tones are defined as small size RUs. The small size RUs supported for OFDMA EHT PPDUs comprise 26-tone RUs, 52-tone Rus, and 106-tone Rus, and the large size RUs supported for OFDMA EHT PPDUs comprise 242-tone RUs, 484-tone RUs, 996-tone Rus, and 2×996-tone RUs. Small size RUs can only be combined with small size RUs to form small size MRUs. The small size MRUs supported for OFDMA EHT PPDUs comprise 52+26-tone MRUs and 106+26-tone MRUs. Large size RUs can only be combined with large size RUs to form large size MRUs. The large size MRUs supported for OFDMA EHT PPDU comprise 484+242-tone MRUs, 996+484-tone MRU, 2×996+484-tone MRU, 3×996-tone MRU, and 3×996+484-tone MRU. Small size RUs or MRUs, 242-tone RUs, 484-tone Rus, and 484+242-tone MRUs are applicable to 80 MHz, 160 MHz, or 320 MHz OFDMA EHT PPDU. 996-tone RUs and 996+484-tone MRUs are applicable to 160 MHz or 320 MHz OFDMA EHT PPDU, and 2×996-tone RUs, 2×996+484-tone MRUs, 3×996-tone MRUs, and 3×996+484-tone MRUs are applicable to 320 MHz OFDMA EHT PPDU.

An OFDMA EHT PPDU is a 20 MHz EHT PPDU with RUs and/or MRUs smaller than 242-tone, or a 40 MHz EHT PPDU with RUs and/or MRUs smaller than 484-tone, or an 80 MHz EHT PPDU with RUs and/or MRUs smaller than 996-tone, or a 160 MHz EHT PPDU with RUs and/or MRUs smaller than 2×996-tone, or a 320 MHz EHT PPDU with RUs and/or MRUs smaller than 4×996-tone.

An RU or MRU can be physical or logical. Various types of physical RUs or MRUs can be directly generated from physical subcarriers according to the IEEE 802.11be D1.4. Any physical small size RU or MRU can be in a same 20 MHz channel, and any physical 242-tone RU, 484-tone RU, 996-tone RU, or 2×996-tone RU corresponds to a 20 MHz channel, a 40 MHz channel, an 80 MHz channel, or a 160 MHz channel, respectively. Further, 484-tone RU and 242-tone RU of any physical 484+242-tone MRU can be in a same 80 MHz channel. 996-tone RU and 484-tone RU of any physical 996+484-tone MRU can be in a same 160 MHz channel, and two 996-tone RUs and 484-tone RU of any physical 2×996+484-tone can be in three consecutive 80 MHz channels.

Logical RUs or MRUs can be generated from physical subcarriers via distributed tone mapping. Physical subcarriers of any logical small size RU or MRU may span over a portion of PPDU bandwidth or whole PPDU bandwidth, and physical subcarriers of any logical 242-tone RU, 484-tone RU, 484+242-tone MRU, 996-tone RU, 996+484-tone MRU, 2×996-tone RU, 2×996+484-tone MRU, 3×996-tone MRU, or 3×996+484-tone MRU may span over a portion of PPDU bandwidth or whole PPDU bandwidth as well. Compared to physical RUs/MRUs, logical RUs/MRUs may bring more frequency diversity gain; but may increase implementation complexity.

Three RU allocation modes are supported for OFDMA PPDU and include a physical RU allocation mode, a logical RU allocation mode, and a hybrid RU allocation mode. The OFDMA PPDU may be an OFDMA EHT PPDU or an OFDMA PPDU for communication specification and/or communication standards such as IEEE specification and/or IEEE standards, such as a next generation IEEE 802.11 technology beyond the IEEE 802.11be.

Physical RU Allocation Mode

When the physical RU allocation mode is applied to the data field of an OFDMA PPDU, a physical RU or MRU for a non-MU-MIMO allocation is assigned to a STA, and a physical RU or MRU for a MU-MIMO allocation is assigned to more than one STA. For a downlink OFDMA EHT PPDU (e.g., EHT MU PPDU), the RU allocation information for an STA is carried in the common field and the STA's user field of the EHT-SIG field. For an uplink OFDMA EHT PPDU (e.g., EHT TB PPDU), the RU allocation information for an STA is included in the STA's user information field of the soliciting trigger frame. The STA can determine the allocated physical RU or MRU after decoding its RU allocation information.

When the physical RU allocation mode is applied to an OFDMA PPDU, the operating bandwidth (BW) of each intended STA of the OFDMA PPDU may be smaller than the PPDU BW. In other words, for a 40 or 80 MHz OFDMA PPDU, an intended STA may be a 20 MHz operating STA. A 20 MHz operating STA is a STA that is operating in a 20 MHz channel width, such as a 20 MHz-only STA or a STA that reduces its operating channel width to 20 MHz. For a 160 MHz OFDMA PPDU, an intended STA may be a 20 MHz operating STA or an 80 MHz operating STA. An 80 MHz operating STA is a STA capable of operating with an 80 MHz channel width or lower. For a 320 MHz OFDMA PPDU, an intended STA may be a 20 MHz operating STA, an 80 MHz operating STA or a 160 MHz operating STA. A 160 MHz operating STA is a STA capable of operating with a 160 MHz channel width or lower.

Logical RU Allocation Mode

When the logical RU allocation mode is applied to the data field of an OFDMA PPDU, a logical RU or MRU for a non-MU-MIMO allocation is assigned to a STA, and a logical RU/MRU for a MU-MIMO allocation is assigned to more than one STA. For a downlink OFDMA MU PPDU (e.g., EHT MU PPDU), the RU allocation information for an STA is carried in the common field and the STA's user field of the EHT-SIG field. For an uplink OFDMA EHT PPDU (e.g., EHT TB PPDU), the RU allocation information for an STA is included in the STA's user information field of the soliciting trigger frame. The STA can determine the allocated logical RU or MRU after decoding its RU allocation information.

Various embodiments for generating logical RUs or MRUs from physical subcarriers are described below. It is understood that the present disclosure is not limited in any way to the embodiments, such as first embodiment to sixth embodiment and the like, that are represented in the description and the drawings. Many variations and combinations of embodiments are possible within the framework of the present disclosure. Combinations of one or more aspects of the embodiments or combinations of different embodiments are possible within the framework of the present disclosure. All comparable variations are understood to fall within the framework of the present disclosure.

First Embodiment

This embodiment is applicable to 20 MHz, 40 MHz, 80 MHz, 160 MHz, or 320 MHz OFDMA PPDU.

Figure 2:
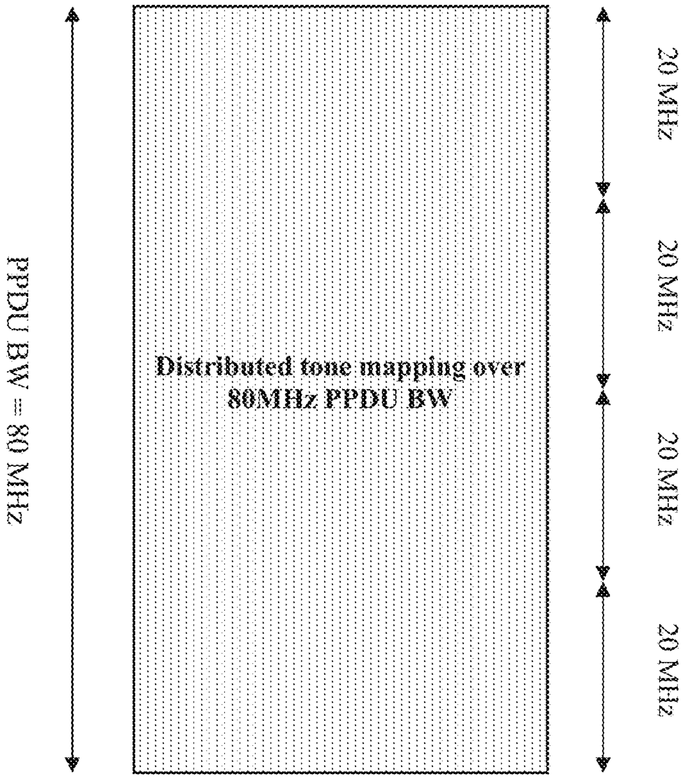
FIG. 2 is a schematic diagram illustrating a data field of an example 80 MHz OFMDA PPDU with a logical RU allocation mode applied according to a first embodiment of the present disclosure.

A logical RU or MRU comprises multiple logical subcarriers which can be generated from physical subcarriers via distributed tone mapping over whole PPDU bandwidth. FIG. 2 illustrates the data field of an example 80 MHz OFMDA PPDU with the logical RU allocation mode applied according to the first embodiment. As a result, physical subcarriers corresponding to any logical RU or MRU allowed in an OFDMA PPDU span over whole PPDU bandwidth, which would result in improved frequency diversity gain for any RU or MRU allowed in an OFDMA PPDU.

When the logical RU allocation mode is applied to the data field of an OFDMA PPDU, the operating bandwidth of each intended STA of the PPDU cannot be smaller than the PPDU BW. In more details, for a 40 or 80 MHz OFDMA PPDU, an intended STA cannot be a 20 MHz operating STA. For a 160 MHz OFDMA PPDU, an intended STA can be neither a 20 MHz operating STA nor an 80 MHz operating STA. For a 320 MHz OFDMA PPDU, an intended STA can be neither of a 20 MHz operating STA, an 80 MHz operating STA, and a 160 MHz operating STA.

Second Embodiment

This embodiment is applicable to 20 MHz, 40 MHz, 80 MHz, 160 MHz, or 320 MHz OFDMA PPDU. This embodiment is equivalent to the first embodiment for a 20 MHz OFDMA PPDU.

Figure 3:
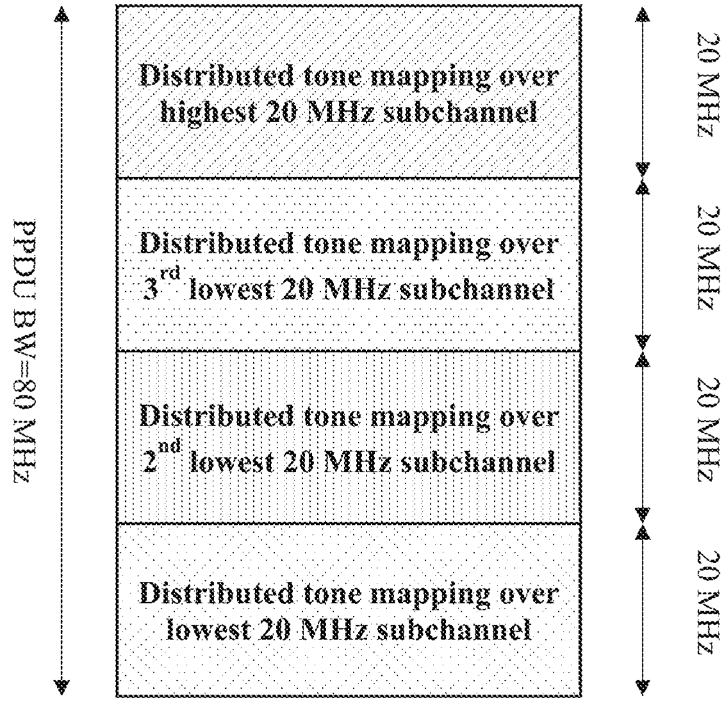
FIG. 3 is a schematic diagram illustrating a data field of an example 80 MHz OFMDA PPDU with a logical RU allocation mode applied according to a second embodiment of the present disclosure.

A logical RU or MRU comprises multiple logical subcarriers which can be generated from physical subcarriers via distributed tone mapping over each of 20 MHz subchannels in the PPDU bandwidth. FIG. 3 illustrates the data field of an example 80 MHz OFMDA PPDU with the logical RU allocation mode applied according to the second embodiment. As a result, physical subcarriers corresponding to any logical small size RU or MRU span over 20 MHz subchannel, which would result in improved frequency diversity gain for any small size RU or MRU. However, frequency diversity gain for any large size RU or MRU allowed in an OFDMA PPDU may not be improved.

When the logical RU allocation mode is applied to the data field of an OFDMA PPDU, the operating bandwidth of each intended STA of the PPDU may be smaller than the PPDU BW. In more details, for a 40 or 80 MHz OFDMA PPDU, an intended STA may be a 20 MHz operating STA. For a 160 MHz OFDMA PPDU, an intended STA may be a 20 MHz operating STA or an 80 MHz operating STA. For a 320 MHz OFDMA PPDU, an intended STA may be a 20 MHz operating STA, an 80 MHz operating STA, or a 160 MHz operating STA.

Third Embodiment

This embodiment is applicable to 80 MHz, 160 MHz, or 320 MHz OFDMA PPDU. This embodiment is equivalent to the first embodiment for an 80 MHz OFDMA PPDU.

Figure 4:
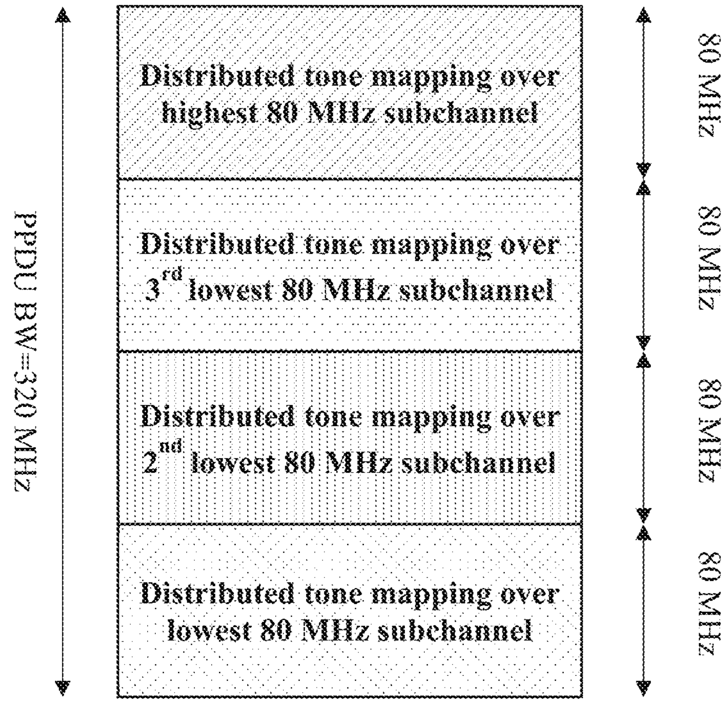
FIG. 4 is a schematic diagram illustrating a data field of an example 320 MHz OFMDA PPDU with a logical RU allocation mode applied according to a third embodiment of the present disclosure.

A logical RU or MRU comprises multiple logical subcarriers which can be generated from physical subcarriers via distributed tone mapping over each of 80 MHz frequency subblocks in the PPDU bandwidth. FIG. 4 illustrates the data field of an example 320 MHz OFMDA PPDU with the logical RU allocation mode applied according to the third embodiment. As a result, physical subcarriers corresponding to any logical small size RU or MRU, 242-tone RU, 484-tone RU, or 484+242-tone MRU span over the 80 MHz frequency subblock, which would result in improved frequency diversity gain for any small size RU or MRU, 242-tone RU, 484-tone RU, 484+242-tone MRU, 996+484-tone MRU, 2×996+484-tone MRU, or 3×996+484-tone MRU. However, frequency diversity gain for any of other large size RUs or MRUs allowed in an OFDMA PPDU may not be improved.

When the logical RU allocation mode is applied to the data field of a 160 MHz or 320 MHz OFDMA PPDU, the operating bandwidth of each intended STA of the PPDU may be smaller than the PPDU BW. In more details, for a 160 MHz or 320 MHz OFDMA PPDU, an intended STA may be an 80 MHz operating STA, and for a 320 MHz OFDMA PPDU, an intended STA may be a 160 MHz operating STA. However, when the logical RU allocation mode is applied to an 80 MHz, 160 MHz, or 320 MHz OFDMA PPDU, an intended STA cannot be a 20 MHz operating STA.

Fourth Embodiment

This embodiment is applicable to 160 MHz or 320 MHz OFDMA PPDU. This embodiment is equivalent to the first embodiment for a 160 MHz OFDMA PPDU.

Figure 5:
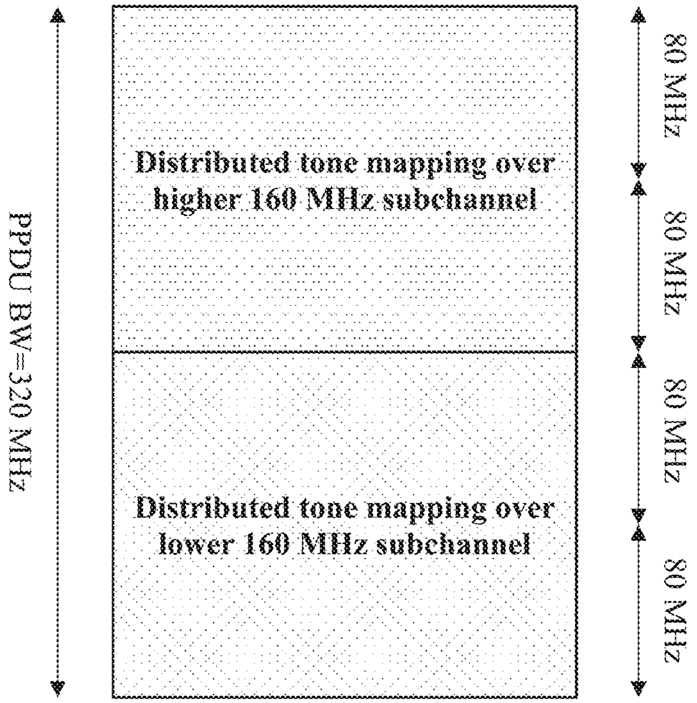
FIG. 5 is a schematic diagram illustrating a data field of an example 320 MHz OFMDA PPDU with a logical RU allocation mode applied according to a fourth embodiment of the present disclosure.

A logical RU or MRU comprises multiple logical subcarriers which can be generated from physical subcarriers via distributed tone mapping over each of 160 MHz channels in the PPDU bandwidth. FIG. 5 illustrates the data field of an example 320 MHz OFMDA PPDU with the logical RU allocation mode applied according to the fourth embodiment. As a result, physical subcarriers corresponding to any logical small size RU or MRU, 242-tone RU, 484-tone RU, 484+242-tone MRU, 996-tone RU, or 996+484-tone MRU span over 160 MHz channel, which would result in improved frequency diversity gain for any small size RU or MRU, 242-tone RU, 484-tone RU, 484+242-tone MRU, 996-tone RU, 996+484-tone MRU, 2×996+484-tone MRU, 3×996-tone MRU, or 3×996+484-tone MRU. However, frequency diversity gain for any of other large size RU or MRU allowed in an OFDMA PPDU may not be improved.

When the logical RU allocation mode is applied to the data field of a 320 MHz OFDMA PPDU, the operating bandwidth of each intended STA of the PPDU may be smaller than PPDU BW. In more details, for a 320 MHz OFDMA PPDU, an intended STA may be a 160 MHz operating STA. However, when the logical RU allocation mode is applied to a 160 MHz or 320 MHz OFDMA PPDU, an intended STA of the PPDU can be neither a 20 MHz operating STA nor an 80 MHz operating STA.

Hybrid RU Allocation Mode

When the hybrid RU allocation mode is applied to the data field of an OFDMA PPDU, the PPDU BW is divided into two portions: a physical RU allocation BW and a logical RU allocation BW. The physical RU allocation BW comprises one or more continuous 20 MHz subchannels in the PPDU BW including an edge 20 MHz subchannel while the logical RU allocation BW comprises remaining 20 MHz subchannel(s) in the PPDU BW. The hybrid RU allocation mode is not applicable to 20 MHz OFDMA PPDU. In some embodiments, the edge 20 MHz subchannel may be a top edge 20 MHz subchannel or a bottom edge 20 MHz subchannel.

When the hybrid RU allocation mode is applied to the data field of an OFDMA PPDU, a logical or physical RU or MRU for a non-MU-MIMO allocation is assigned to a STA, and a logical or physical RU or MRU for a MU-MIMO allocation is assigned to more than one STA. For a downlink OFDMA PPDU (e.g., EHT MU PPDU), the RU allocation information for an STA is carried in the common field and the STA's user field of the EHT-SIG field. For an uplink OFDMA PPDU (e.g., EHT TB PPDU), the RU allocation information for an STA is included in the STA's user information field of the soliciting trigger frame. The STA can determine the allocated physical or logical RU or MRU after decoding its RU allocation information.

Within the logical RU allocation BW, the logical RUs or MRUs are generated from physical subcarriers by using similar methods as described in the above embodiments of the logical RU allocation mode, except that the logical RU allocation BW is used instead of the PPDU bandwidth.

Various embodiments can be used for dividing the PPDU BW into physical RU allocation BW and logical RU allocation BW.

Fifth Embodiment

Figure 6:
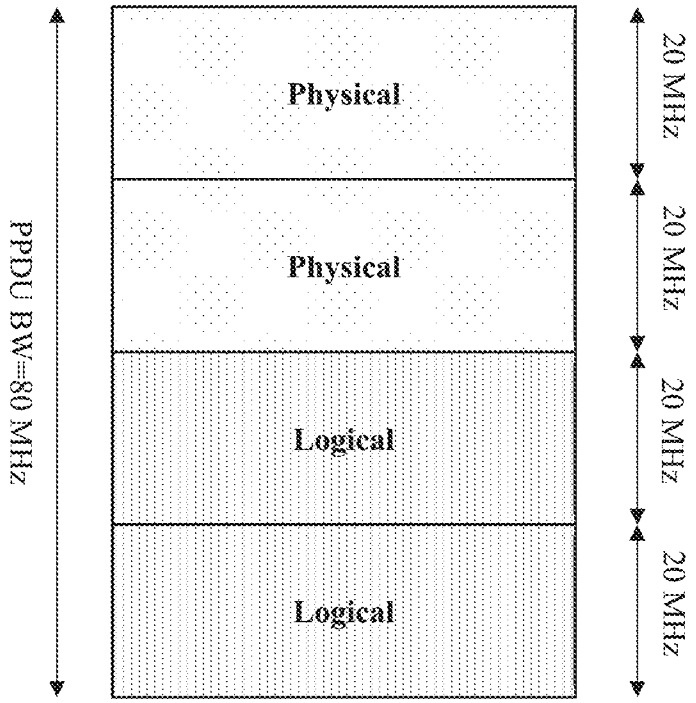
FIG. 6 is a schematic diagram illustrating a data field of an example 80 MHz OFMDA PPDU with a hybrid RU allocation mode applied according to a fifth embodiment of the present disclosure.

The physical RU allocation BW is a half of the PPDU BW comprising an edge 20 MHz subchannel while the logical RU allocation BW is the other half of the PPDU BW. This embodiment is applicable to 40 MHz, 80 MHz, 160 MHz, or 320 MHz OFDMA PPDU. FIG. 6 illustrates the data field of an example 80 MHz OFMDA PPDU with the hybrid RU allocation mode applied according to the fifth embodiment. In some embodiments, the edge 20 MHz subchannel may be a top edge 20 MHz subchannel or a bottom edge 20 MHz subchannel.

When the hybrid RU allocation mode is applied to the data field of an OFDMA PPDU, the operating bandwidth of each intended STA of the EHT PPDU may be smaller than the PPDU BW. In more details, for a 40 MHz OFDMA PPDU, an intended STA may be a 20 MHz operating STA, for which the allocated RU or MRU can be in the physical or logical RU allocation BW. For an 80 MHz, 160 MHz, or 320 MHz OFDMA PPDU, an intended STA may be a 20 MHz operating STA, for which the allocated RU or MRU can be in the physical RU allocation BW. If the logical RUs or MRUs are generated from physical subcarriers according to the second embodiment, the allocated RU or MRU for a 20 MHz operating STA can also be in the logical RU allocation BW. For a 160 MHz OFDMA PPDU, an intended STA may also be an 80 MHz operating STA, for which the allocated RU or MRU can be in physical or logical RU allocation BW. For a 320 MHz OFDMA PPDU, an intended STA may also be a 160 MHz operating STA, for which the allocated RU or MRU can be in physical or logical RU allocation BW. An intended STA may also be an 80 MHz operating STA, for which the allocated RU or MRU can be in physical RU allocation BW. If the logical RUs or MRUs are generated from physical subcarriers according to the second embodiment or the third embodiment, the allocated RU or MRU for an 80 MHz operating STA can also be in the logical RU allocation BW.

Sixth Embodiment

Figure 7:
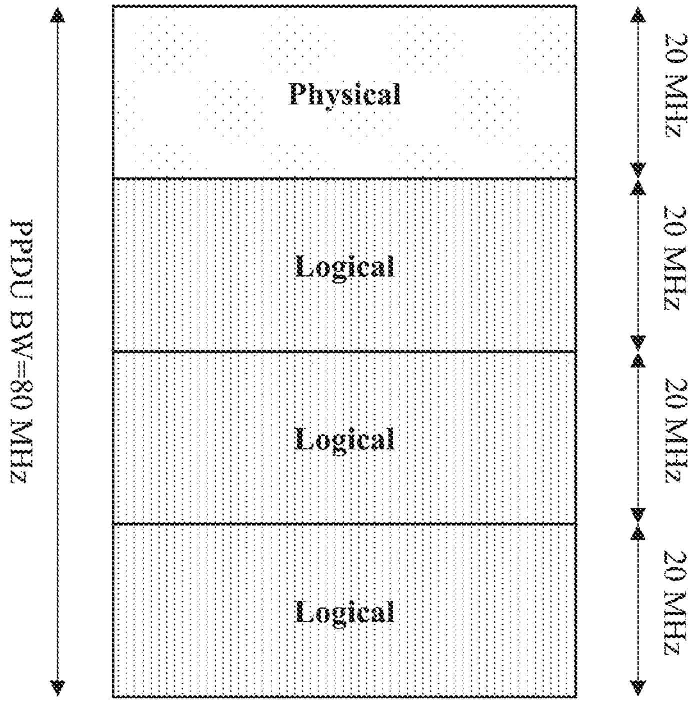
FIG. 7 is a schematic diagram illustrating a data field of an example 80 MHz OFMDA PPDU with a hybrid RU allocation mode applied according to a sixth embodiment of the present disclosure.

The physical RU allocation BW is a quarter of the PPDU BW including an edge 20 MHz subchannel while the logical RU allocation BW is the remaining three quarters of the PPDU BW; vice versa. That is, in other some embodiments, physical RU allocation BW is three quarters of the PPDU BW including an edge 20 MHz subchannel while the logical RU allocation BW is the remaining one quarter of the PPDU BW. This embodiment is applicable to 80 MHz, 160 MHz, or 320 MHz OFDMA PPDU. FIG. 7 illustrates the data field of an example 80 MHz OFMDA PPDU with the hybrid RU allocation mode applied according to the sixth embodiment. In some embodiments, the edge 20 MHz subchannel may be a top edge 20 MHz subchannel or a bottom edge 20 MHz subchannel.

When the hybrid RU allocation mode is applied to the data field of an OFDMA PPDU, the operating bandwidth of each intended STA of the EHT PPDU may be smaller than the PPDU BW. In more details, for an 80 MHz, 160 MHz, or 320 MHz OFDMA PPDU, an intended STA may be a 20 MHz operating STA, for which the allocated RU or MRU can be in the physical RU allocation BW. If the logical RUs or MRUs are generated from physical subcarriers according to the second embodiment, the allocated RU or MRU for a 20 MHz operating STA can also be in the logical RU allocation BW. For a 160 MHz OFDMA PPDU, an intended STA may also be an 80 MHz operating STA, for which the allocated RU or MRU can be in physical RU allocation BW if the physical RU allocation BW is larger than the logical RU allocation BW. If the physical RU allocation BW is smaller than the logical RU allocation BW and the logical RUs or MRUs are generated from physical subcarriers according to the third embodiment, the allocated RU or MRU for an 80 MHz operating STA can also be in the logical RU allocation BW. For a 320 MHz OFDMA PPDU, an intended STA may also be an 80 MHz operating STA, for which the allocated RU or MRU can be in physical RU allocation BW. If the logical RUs or MRUs are generated from physical subcarriers according to the second or third embodiment, the allocated RU or MRU for an 80 MHz operating STA can also be in the logical RU allocation BW. For a 320 MHz OFDMA PPDU, an intended STA may also be a 160 MHz operating STA, for which the allocated RU or MRU can be in physical RU allocation BW if the physical RU allocation BW is larger than the logical RU allocation BW. If the physical RU allocation BW is smaller than the logical RU allocation BW and the logical RUs or MRUs are generated from physical subcarriers according to the second, third or fourth embodiment, the allocated RU or MRU for a 160 MHz operating STA can also be in the logical RU allocation BW.

Signaling Support dot11EHTBaseLineFeaturesImplementedOnly is one of MIB (management information base) variables maintained by an STA's (or an AP's) SME (system management entity). STA (or AP) with dot11EHTBaseLine FeaturesImplementedOnly equal to true refers to an STA (or an AP) that supports one or more EHT baseline features such as MRU and multi-link operation which have been defined in IEEE 802.11be D1.4, but does not support any of EHT advanced features such as logical RUs, which will be defined in communication specification and/or communication standards such as IEEE specification and/or IEEE standards, such as a later IEEE 802.11be draft (such as IEEE 802.11be D3.0) or a next-generation IEEE 802.11 standard beyond IEEE 802.11be. STA (or AP) with dot11EHTBase LineFeaturesImplementedOnly equal to false refers to an STA (or an AP) that supports not only one or more EHT baseline features such as MRU and multi-link operation, but also one or more EHT advanced features such as RU interleaving as well as one or more features to be defined in a next-generation IEEE 802.11 standard beyond IEEE 802.11be.

Uplink OFDMA

FIG. 8A illustrates a format of a trigger frame for soliciting a TB PPDU transmission. The trigger frame may comprise an EHT variant common information field, a user information list field and a padding field. The user information list field may comprise one or more user information fields. The formats of the EHT variant common information field and the user information field depend on the type of the trigger frame. FIG. 8B illustrates an example format of the EHT variant common information field.

The EHT variant common information field may comprise a first subfield, e.g., an RU allocation mode subfield, to indicate which one of the physical RU allocation mode, the logical RU allocation mode, and the hybrid RU allocation mode is used for the solicited TB PPDU. The bit position of the RU allocation mode subfield can be any two of B56 to B62 (e.g., B56 and B57) of the EHT variant common information field, which are reserved and set to all Is for the transmitting AP with dot11EHTBaseLine FeaturesImplementedOnly equal to true. In this case, for the transmitting AP with dot11EHTBaseLineFeaturesImplementedOnly equal to false, the RU Allocation Mode subfield may be set to 3 (i.e., the RU allocation mode subfield is set to all 1s) to indicate the physical RU allocation mode is used for the solicited TB PPDUs, set to 0 to indicate the logical RU allocation mode is used for the solicited TB PPDUs, and set to 1 to indicate the hybrid RU allocation mode is used for the solicited TB PPDUs. Consequently, when an STA with dot11EHTBaseLineFeaturesImplementedOnly equal to true receives a trigger frame with the RU allocation mode subfield of the EHT variant common information field set to a value other than 3, it may terminate the reception of the trigger frame and thus power consumption of the STA can be reduced. In other some cases, for the transmitting AP with dot11EHTBaseLineFeaturesImplementedOnly equal to false, the RU Allocation Mode subfield may be set to 3 (i.e., the RU allocation mode subfield is set to all 1s) to indicate the physical RU allocation mode is used for the solicited TB PPDUs, set to 1 to indicate the logical RU allocation mode is used for the solicited TB PPDUs, and set to 0 to indicate the hybrid RU allocation mode is used for the solicited TB PPDUs.

The EHT variant common information field may comprise a second subfield, e.g., a hybrid RU allocation pattern subfield, to indicate how the PPDU bandwidth is divided into the physical RU allocation BW and the logical RU allocation BW. The bit position of the hybrid RU allocation pattern subfield can be any three of B56 to B62 (e.g., B58 to B60) of the EHT variant Common Information field, which are reserved and set to all Is for the transmitting AP with dot11EHTBaseLineFeaturesImplementedOnly equal to true. In this case, for the transmitting AP with dot11EHTBaseLineFeaturesImplementedOnly equal to false, the Hybrid RU allocation pattern subfield is set to 0 to indicate the physical RU allocation BW is a half of the PPDU bandwidth comprising the lowest 20 MHz subchannel and the logical RU allocation BW is the other half of the PPDU bandwidth, set to 1 to indicate the physical RU allocation BW is a half of the PPDU bandwidth comprising the highest 20 MHz subchannel and the logical RU allocation BW is the other half of the PPDU bandwidth, set to 2 to indicate the physical RU allocation BW is a quarter of the PPDU bandwidth comprising the lowest 20 MHz subchannel and the logical RU allocation BW is the remaining three quarters of the PPDU bandwidth, and set to 3 to indicate the physical RU allocation BW is a quarter of the PPDU bandwidth comprising the highest 20 MHz subchannel and the logical RU allocation BW is the remaining three quarters of the PPDU bandwidth, set to 4 to indicate the logical RU allocation BW is a quarter of the PPDU bandwidth comprising the lowest 20 MHz subchannel and the physical RU allocation BW is the remaining three quarters of the PPDU bandwidth, and set to 5 to indicate the logical RU allocation BW is a quarter of the PPDU bandwidth comprising the highest 20 MHz subchannel and the physical RU allocation BW is the remaining three quarters of the PPDU bandwidth. Consequently, when an STA with dot11EHTBase LineFeaturesImplementedOnly equal to true receives a trigger frame with the Hybrid RU allocation pattern subfield of the EHT variant common information field set to a value other than 7, it may terminate the reception of the trigger frame and thus power consumption of the STA can be reduced.

Downlink OFDMA

Table 2 below illustrates an example format of a U-SIG field of a MU PPDU. The U-SIG field is designed to bring forward compatibility to the preamble via the introduction of version independent fields. These are the fields that will be consistent in location and interpretation across multiple IEEE 802.11 PHY versions. The intent of the version independent content is to achieve better coexistence among IEEE 802.11 PHY versions that are defined for 2.4, 5, and 6 GHz spectrum from EHT PHY onwards. In addition, the U-SIG field can have some version dependent fields that are fields specific to an IEEE 802.11 PHY version. The U-SIG field includes version independent bits followed by version dependent bits. In addition, the U-SIG field includes one or more Validate fields and/or Disregard fields. Validate field values serve to indicate whether to continue reception of a MU PPDU at an STA. If an STA encounters a MU PPDU where at least one field in the preamble that is identified as validate for the STA is not set to the value specified for the field, the STA can defer for the duration of the MU PPDU, report the information from the version independent fields within the RXVECTOR, and terminate the reception of the MU PPDU. If an STA sees any of the fields identified as Disregard for the STA set to a value that is different from its specified value, it can ignore these field values and they will have no impact on STA's continued reception of the PPDU (i.e., reception at the STA can continue as usual).

As illustrated in Table 2, the U-SIG field may comprise a first subfield, e.g., an RU Allocation Mode subfield, to indicate which one of the physical RU allocation mode, the logical RU allocation mode, and the hybrid RU allocation mode is used for the MU PPDU. The bit position of the RU Allocation Mode subfield can be two of B20 to B25 of U-SIG-1, B2 of U-SIG-2 and B8 of U-SIG-2 (e.g., B20 and B21), which are treated as validate or disregard and set to all 1s for the transmitting AP with dot11EHT BaseLineFeaturesImplementedOnly equal to true. For example, the first subfield may be set to 3 (i.e., each bit of the first subfield is set to 1) to indicate the physical RU allocation mode is used for the MU PPDU, set to 0 to indicate the logical RU allocation mode is used for the MU PPDU, and set to 1 to indicate the hybrid RU allocation mode is used for the MU PPDU. Consequently, when an STA with dot11EHT BaseLineFeaturesImplementedOnly equal to true receives a MU PPDU with the RU allocation mode subfield of the U-SIG field set to a value other than 3, it may terminate the reception of the MU PPDU and thus power consumption of the STA can be reduced. In other some embodiments, for example, the first subfield may be set to 3 (i.e., each bit of the first subfield is set to 1) to indicate the physical RU allocation mode is used for the MU PPDU, set to 1 to indicate the logical RU allocation mode is used for the MU PPDU, and set to 0 to indicate the hybrid RU allocation mode is used for the MU PPDU.

The U-SIG field may include a second subfield, e.g., a Hybrid RU allocation pattern subfield, to indicate how the PPDU bandwidth is divided into the physical RU allocation BW and the logical RU allocation BW. The bit position of the Hybrid RU allocation pattern subfield can be three of B20 to B25 of U-SIG-1 (e.g., B22 to B24), B2 of U-SIG-2, and B8 of U-SIG-2, which are treated as validate or disregard and set to all Is for the transmitting AP with dot11EHTBaseLineFeaturesImplementedOnly equal to true. For the transmitting AP with dot11EHT BaseLineFeatures-ImplementedOnly equal to false, the second subfield may be set to 0 to indicate the physical RU allocation BW is a half of the PPDU bandwidth comprising the lowest 20 MHz subchannel and the logical RU allocation BW is the other half of the PPDU bandwidth, set to 1 to indicate the physical RU allocation BW is a half of the PPDU bandwidth comprising the highest 20 MHz subchannel and the logical RU allocation BW is the other half of the PPDU bandwidth, set to 2 to indicate the physical RU allocation BW is a quarter of the PPDU bandwidth comprising the lowest 20 MHz subchannel and the logical RU allocation BW is the remaining three quarters of the PPDU bandwidth, and set to 3 to indicate the physical RU allocation BW is a quarter of the PPDU bandwidth comprising the highest 20 MHz subchannel and the logical RU allocation BW is the remaining three quarters of the PPDU bandwidth, set to 4 to indicate the logical RU allocation BW is a quarter of the PPDU bandwidth comprising the lowest 20 MHz subchannel and the physical RU allocation BW is the remaining three quarters of the PPDU bandwidth, and set to 5 to indicate the logical RU allocation BW is a quarter of the PPDU bandwidth comprising the highest 20 MHz subchannel and the physical RU allocation BW is the remaining three quarters of the PPDU bandwidth. Consequently, when an STA with dot11EHTBaseLineFeaturesImplementedOnly equal to true receives a MU PPDU with the RU Allocation Mode subfield of the U-SIG field set to a value other than 7, it may terminate the reception of the MU PPDU and thus power consumption of the STA can be reduced.

TABLE 2

| Two parts of U-SIG | Bit | Field | Number of bits | Description |
|---|---|---|---|---|
| U-SIG-1 | B0-B2 | PHY Version Identifier | 3 | Differentiate between different PHY clauses. |
| | B3-B5 | BW | 3 | Indicate PPDU bandwidth |
| | B6 | UL/DL | 1 | Indicate whether the PPDU is sent UL or DL. |
| | B7-B12 | BSS Color | 6 | An identifier of the BSS. |
| | B13-B19 | TXOP | 7 | Indicate duration information for NAV setting and protection of the TXOP. |
| | B20-B21 | RU Allocation Mode | 2 | See [0087] |
| | B22-B24 | Hybrid RU Allocation Pattern | 3 | See [0088] |
| | B25 | Validate | 1 | Set to 1 and treat as Validate |
| U-SIG-2 | B0-B1 | PPDU Type and Compression Mode | 2 | If the UL/DL field is set to 0, a value of 0 indicates a DL OFDMA transmission; and a value of 2 indicates a non-OFDMA DL MU-MIMO transmission. A value of 1 indicates a transmission to a single user or an EHT sounding NDP regardless of UL/DL. Undefined values of this field are Validate. |
| | B2 | Validate | 1 | Set to 1 and treat as Validate |
| | B3-B7 | Punctured Channel Information | 5 | If the PPDU Type and Compression Mode field is set to 1 or 2: B3-B7 points to the entry of a bandwidth dependent table (defined in Table 36-30 of IEEE 802.11be D1.4) to signal the non- OFDMA puncturing pattern of the entire PPDU bandwidth. Undefined values of this field are Validate. If the PPDU Type and Compression Mode field is set to 0: If the BW field is set to a value between 2 and 5, B3-B6 is a 4-bit bitmap that indicates which 20 MHz channel is punctured in the relevant 80 MHz subblock, where B3-B6 apply to from the lowest to the highest frequency 20 MHz channels. For each of the bits B3-B6, a value of 0 indicates that the corresponding 20 MHz channel is punctured, and a value of 1 is used otherwise. |

TABLE 2-continued

| Two parts of U-SIG | Bit | Field | Number of bits | Description |
|---|---|---|---|---|
| | | | | The following allowed punctured patterns (B3-B6) are defined for an 80 MHz subblock: 1111 (no puncturing), 0111, 1011, 1101, 1110, 0011, 1100, and 1001. Any field values other than the allowed punctured patterns are Validate. Field value may be varied from one 80 MHz to the other. If the BW field is set to 0 or 1, which indicates a 20/40 MHz PPDU, B3-B6 are set to all 1s. Other values are Validate. B7 is set to 1 and Disregard. |
| | B8 | Validate | 1 | Set to 1 and treat as Validate |
| | B9-B10 | EHT-SIG MCS | 2 | Indicate the MCS used for modulating the EHT-SIG. |
| | B11-B15 | Number of EHT-SIG Symbols | 5 | Indicate the number of EHT-SIG symbols. |
| | B16-B19 | CRC | 4 | CRC for bits 0-41 of the U-SIG field. Bits 0-41 of the U-SIG field correspond to bits 0-25 of U-SIG-1 followed by bits 0-15 of U-SIG-2. |
| | B20-B25 | Tail | 6 | Used to terminate the trellis of the convolutional decoder. Set to 0. |

FIG. 9 illustrates an example of a wireless communications system according to an embodiment of the present disclosure. The wireless communications system may be an example of a WLAN 100 (also known as a Wi-Fi network) (such as next generation, next big thing (NBT), ultra-high throughput (UHT) or EHT Wi-Fi network) configured in accordance with various aspects of the present disclosure. As described herein, the terms next generation, NBT, UHT, and EHT may be considered synonymous and may each correspond to a Wi-Fi network supporting a high volume of space-time-streams. The WLAN 100 may include an AP 10 and multiple associated STAs 20, which may represent devices such as mobile stations, personal digital assistant (PDAs), other handheld devices, netbooks, notebook computers, tablet computers, laptops, display devices (such as TVs, computer monitors, etc.), printers, etc. The AP 10 and the associated stations 20 may represent a basic service set (BSS) or an extended service set (ESS). The various STAs 20 in the network can communicate with one another through the AP 10. Also illustrated is a coverage area 110 of the AP 10, which may represent a basic service area (BSA) of the WLAN 100. An extended network station (not illustrated) associated with the WLAN 100 may be connected to a wired or wireless distribution system that may allow multiple APs 10 to be connected in an ESS or a VBSS.

In some embodiments, a STA 20 may be located in the intersection of more than one coverage area 110 and may associate with more than one AP 10. A single AP 10 and an associated set of STAs 20 may be referred to as a BSS. An ESS or a VBSS is a set of connected BSSs. A distribution system (not illustrated) may be used to connect APs 10 in an ESS or a VBSS. In some cases, the coverage area 110 of an AP 10 may be divided into sectors (also not illustrated). The WLAN 100 may include APs 10 of different types (such as a metropolitan area, home network, etc.), with varying and overlapping coverage areas 110. Two STAs 20 also may communicate directly via a direct wireless link 125 regardless of whether both STAs 20 are in the same coverage area 110. Examples of direct wireless links 120 may include Wi-Fi direct connections, Wi-Fi tunneled direct link setup (TDLS) links, and other group connections. STAs 20 and APs 10 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11ay, etc. In some other implementations, peer-to-peer connections or ad hoc networks may be implemented within the WLAN 100.

Figure 10:
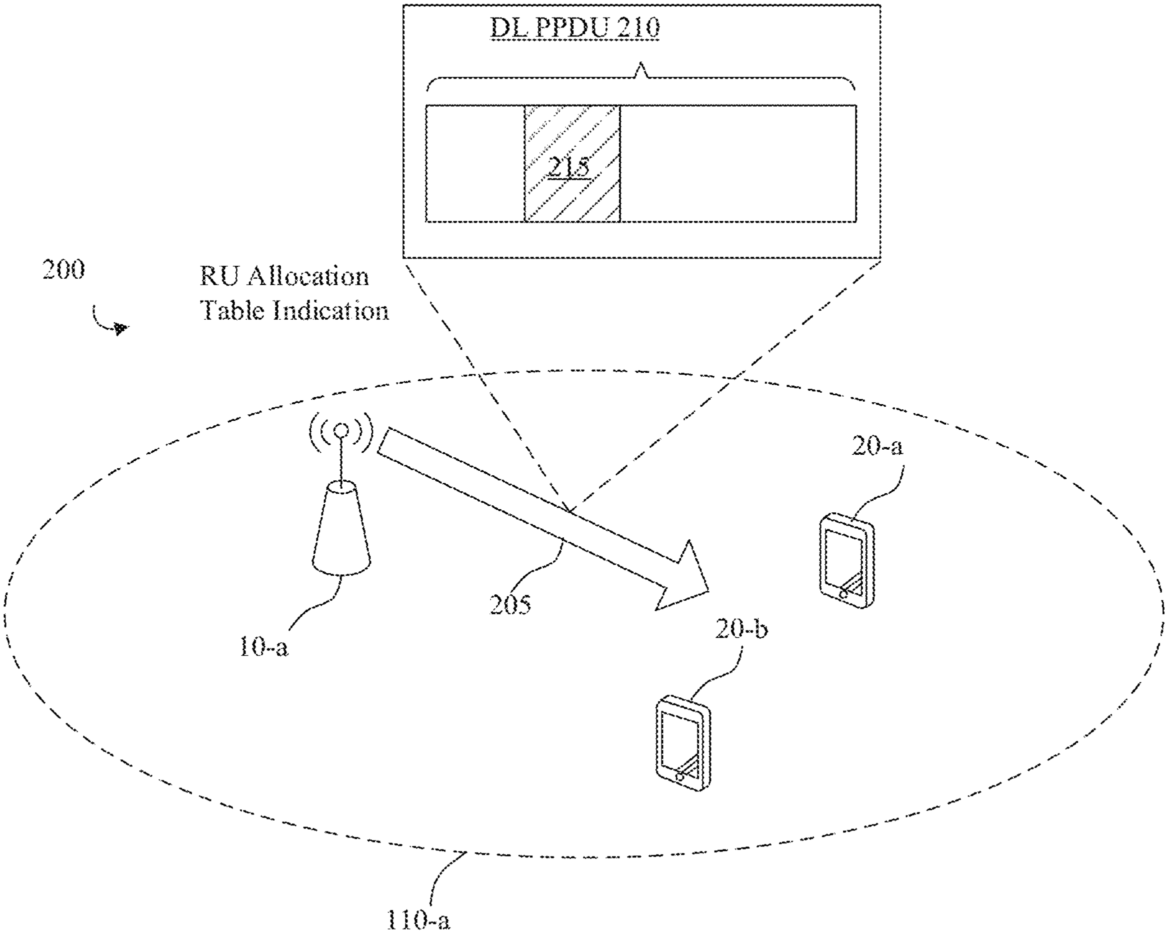
FIG. 10 is a schematic diagram illustrating an example of a wireless communications system according to another embodiment of the present disclosure.

FIG. 10 illustrates an example of a wireless communications system according to another embodiment of the present disclosure. The wireless communications system 200 may be an example of a next generation or EHT Wi-Fi system and may include an AP 10-*a* and STAs 20-*a* and 20-*b*, and a coverage area 110-*a*, which may be examples of components described with respect to FIG. 10. The AP 10-*a* may transmit a DL PPDU 210 (e.g., EHT MU PPDU) including an RU allocation table indication 215 on the downlink 205 to the STAs 20.

In some implementations, a wireless communications system 200 may be a next generation Wi-Fi system (such as, an EHT system). In some implementations, wireless communications system 200 may also support multiple communications systems. For instance, wireless communications system 200 may support EHT communications and HE communications. In some implementations, the STA 20-*a* and the STA 20-*b* may be different types of STAs. For example, the STA 20-*a* may be an example of an EHT STA, while the STA 20-*b* may be an example of an HE STA. The STA 20-*b* may be referred to as a legacy STA.

In some instances, EHT communications may support a larger bandwidth than legacy communications. For instance, EHT communications may occur over an available bandwidth of 320 MHz, whereas legacy communications may occur over an available bandwidth of 160 MHz. Additionally, EHT communications may support higher modulations than legacy communications. For instance, EHT communications may support 4K quadrature amplitude modulation (QAM), whereas legacy communications may support 1024 QAM. EHT communications may support a larger number of spatial streams than legacy systems. In one non-limiting illustrative example, EHT communications may support 16 spatial streams, whereas legacy communications may support 8 spatial streams. In some cases, EHT communications may occur a 2.4 GHz channel, a 5 GHz channel, or a 6 GHz channel in unlicensed spectrum.

Figure 11:
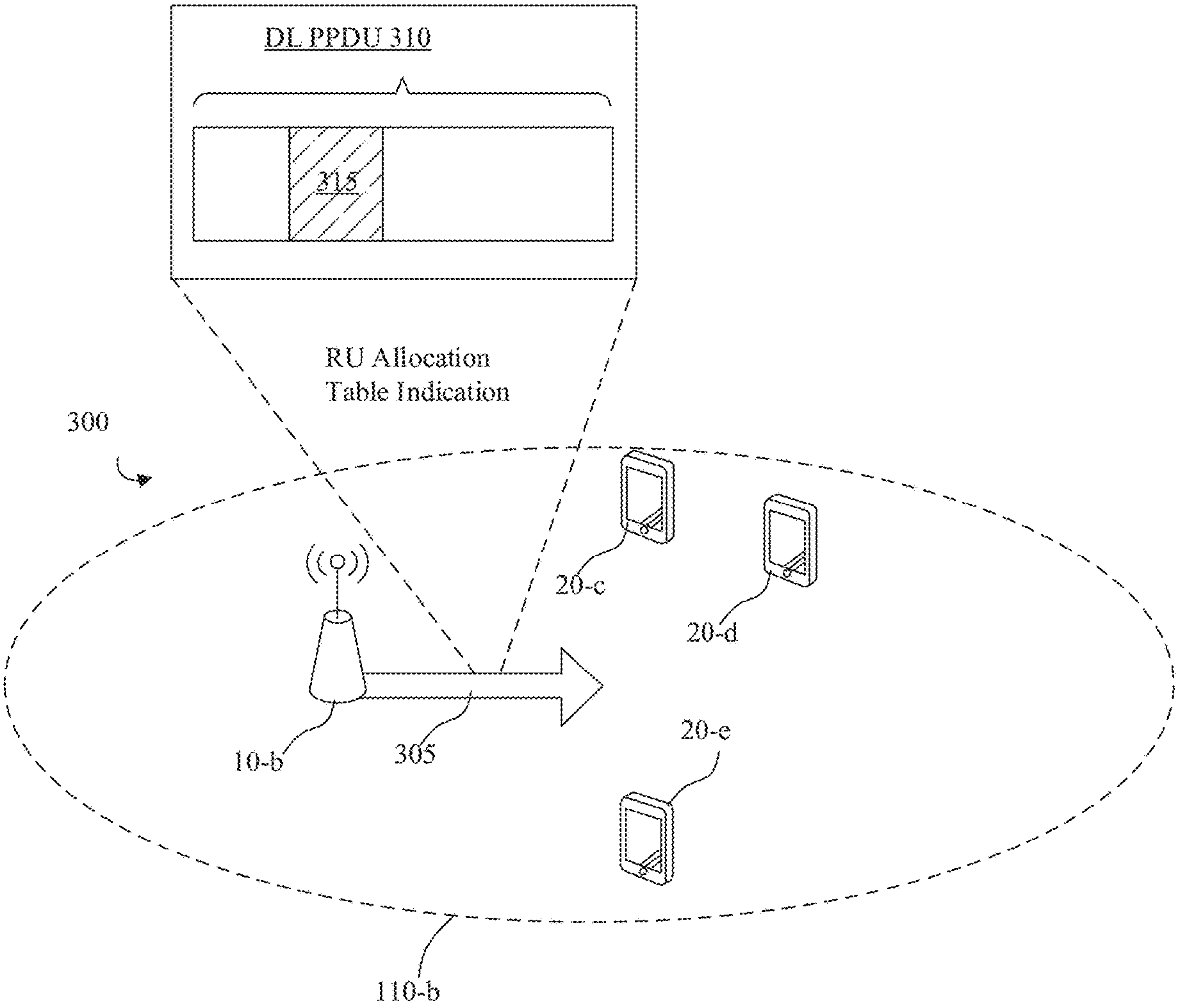
FIG. 11 is a schematic diagram illustrating an example of a wireless communications system according to another embodiment of the present disclosure.

FIG. 11 illustrates an example of a wireless communications system according to another embodiment of the present disclosure. The wireless communications system 300 may be an example of a post-EHT Wi-Fi system and may include an AP 10-*b*. AP 10-*b* may be an example of a post-EHT AP 10. The wireless communications system 300 may include HE STA 20-*c*, EHT STA 20-*d*, and post-EHT STA 20-*e*, and a coverage area 110-*b*, which may be examples of components described with respect to FIGS. 4 and 5. The AP 10-*b* may transmit a DL PPDU 310 including an RU allocation table indication 315 on the downlink 305 to the STAs 20. In some implementations, STAs 20 may be referred to as clients.

Figure 12:
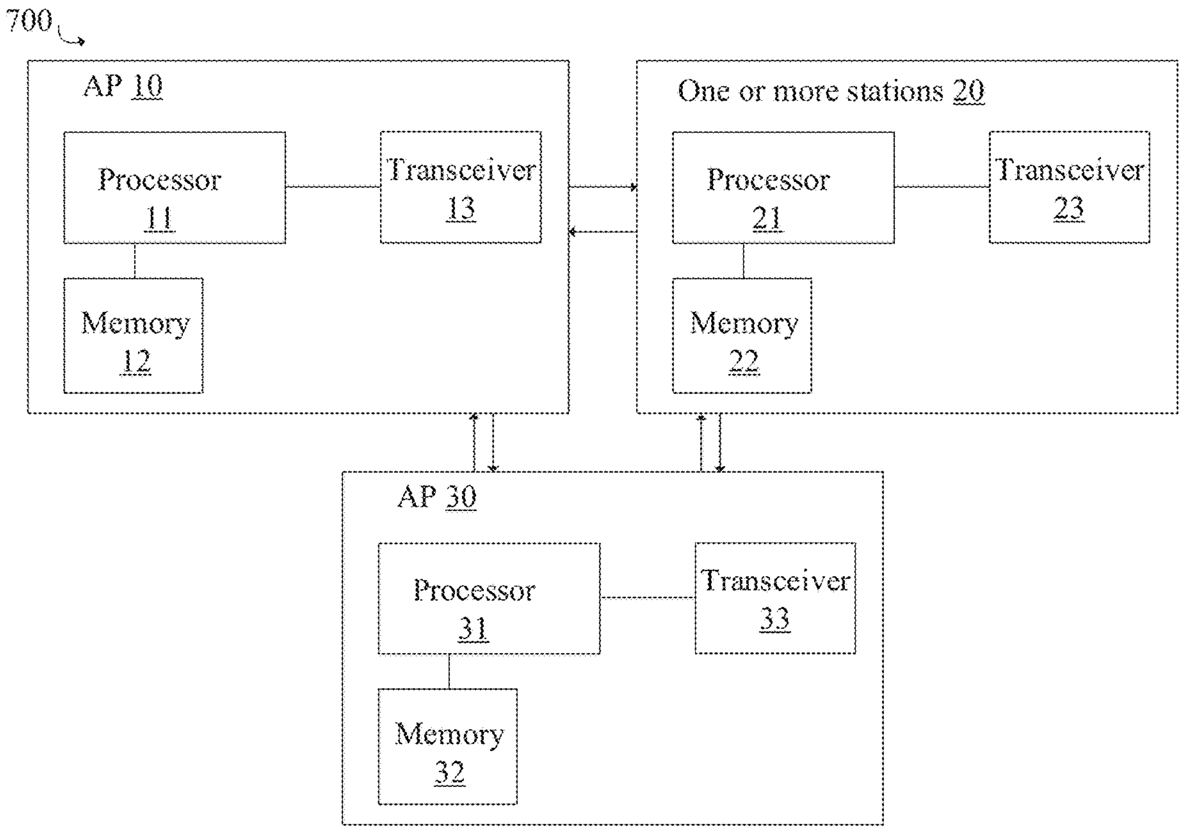
FIG. 12 is a block diagram of one or more stations (STAs) and access points (APs) of communication in a wireless communications system according to an embodiment of the present disclosure.

FIG. 12 illustrates one or more STAs 20, an AP 10, and an AP 30 of communication in a wireless communications system 700 according to an embodiment of the present disclosure. FIG. 12 illustrates that, the wireless communications system 700 includes an AP 10, an AP 30 and one or more STAs 20. The AP 10 may include a memory 12, a transceiver 13, and a processor 11 coupled to the memory 12, the transceiver 13. The AP 30 may include a memory 32, a transceiver 33, and a processor 31 coupled to the memory 32, the transceiver 33. The one or more STAs 20 may include a memory 22, a transceiver 23, and a processor 21 coupled to the memory 22, the transceiver 23. The processor 11, 21 or 31 may be configured to implement proposed functions, procedures and/or methods described in this description. Layers of radio interface protocol may be implemented in the processor 11, 21 or 31. The memory 12, 22 or 32 is operatively coupled with the processor 11, 21 or 31 and stores a variety of information to operate the processor 11, 21 or 31. The transceiver 13, 23 or 33 is operatively coupled with the processor 11, 21 or 31, and the transceiver 13, 23 or 33 transmits and/or receives a radio signal.

The processor 11, 21 or 31 may include application-specific integrated circuit (ASIC), other chipset, logic circuit and/or data processing device. The memory 12, 22 or 32 may include read-only memory (ROM), random access memory (RAM), flash memory, memory card, storage medium and/or other storage device. The transceiver 13, 23 or 33 may include baseband circuitry to process radio frequency signals. When the embodiments are implemented in software, the techniques described herein can be implemented with modules (e.g., procedures, functions, and so on) that perform the functions described herein. The modules can be stored in the memory 12, 22 or 32 and executed by the processor 11, 21 or 31. The memory 12, 22 or 32 can be implemented within the processor 11, 21 or 31 or external to the processor 11, 21 or 31 in which case those can be communicatively coupled to the processor 11, 21 or 31 via various means as is known in the art.

In some embodiments, the processor 11 or 31 is configured to determine an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU. This can solve issues in the prior art, improve frequency diversity gain, reduce power consumption, achieve extremely high throughput (EHT), provide good communication performance, and/or provide high reliability.

In some embodiments, the processor 21 is configured to determine an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU. This can solve issues in the prior art, improve frequency diversity gain, reduce power consumption, achieve extremely high throughput (EHT), provide good communication performance, and/or provide high reliability.

Figure 13:
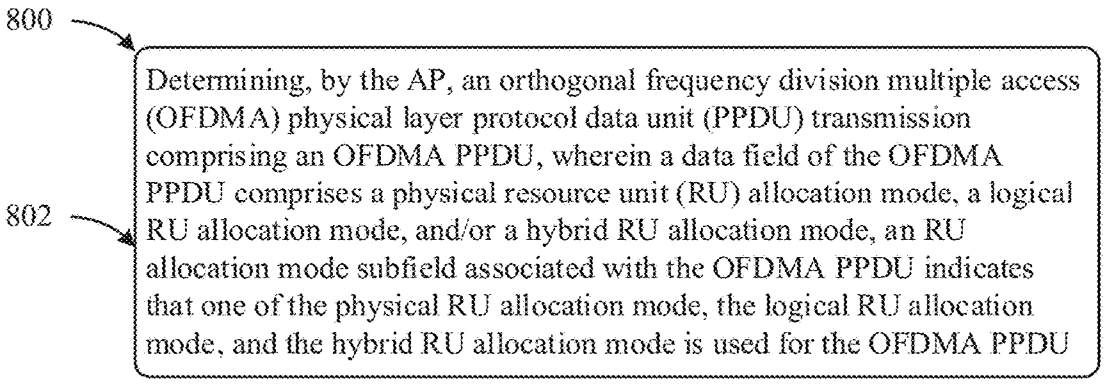
FIG. 13 is a flowchart illustrating a wireless communication method performed by an AP according to an embodiment of the present disclosure.

FIG. 13 illustrates a wireless communication method 800 performed by an AP according to an embodiment of the present disclosure. In some embodiments, the method 800 includes: a block 802, determining, by the AP, an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU. This can solve issues in the prior art, improve frequency diversity gain, reduce power consumption, achieve extremely high throughput (EHT), provide good communication performance, and/or provide high reliability.

Figure 14:
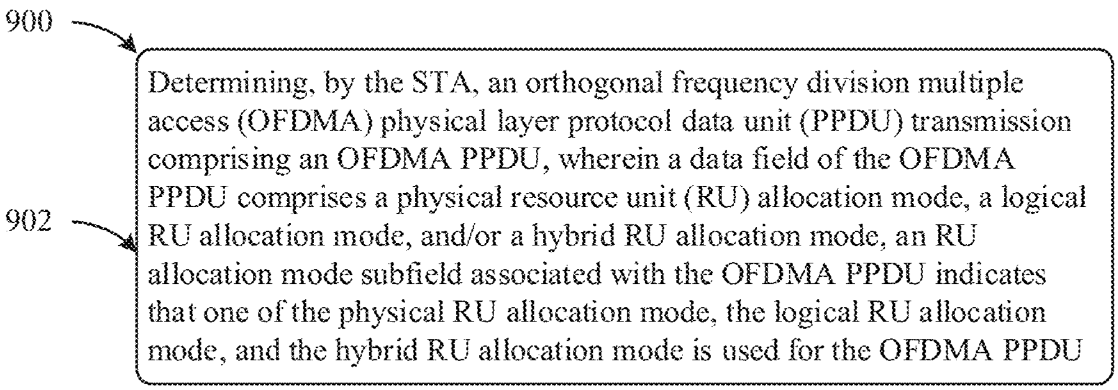
FIG. 14 is a flowchart illustrating a wireless communication method performed by an AP according to another embodiment of the present disclosure.

FIG. 14 illustrates a wireless communication method 900 performed by an AP according to an embodiment of the present disclosure. In some embodiments, the method 900 includes: a block 902, determining, by the STA, an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU. This can solve issues in the prior art, improve frequency diversity gain, reduce power consumption, achieve extremely high throughput (EHT), provide good communication performance, and/or provide high reliability.

Figure 15:
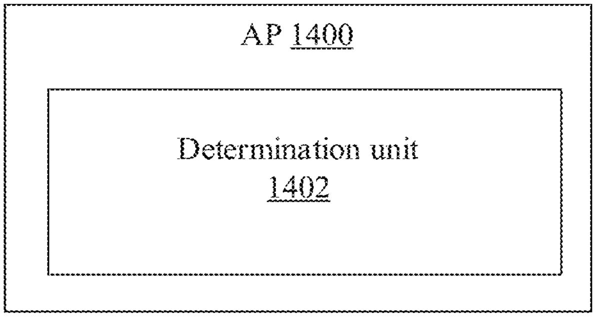
FIG. 15 is a block diagram of an access point (AP) according to an embodiment of the present disclosure.

FIG. 15 is a block diagram of an access point (AP) 1400 according to an embodiment of the present disclosure. The access point (AP) 1400 includes a determination unit 1402 configured to determine an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU. This can solve issues in the prior art, improve frequency diversity gain, reduce power consumption, achieve extremely high throughput (EHT), provide good communication performance, and/or provide high reliability.

Figure 16:
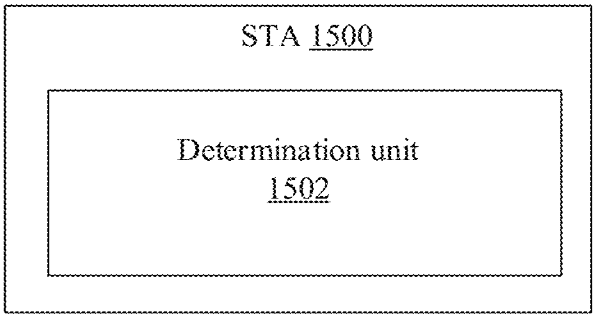
FIG. 16 is a block diagram of a station (STA) according to an embodiment of the present disclosure.

FIG. 16 is a block diagram of a STA 1500 according to an embodiment of the present disclosure. The AP 1500 comprises a determination unit 1502 configured to determine an orthogonal frequency division multiple access (OFDMA) physical layer protocol data unit (PPDU) transmission comprising an OFDMA PPDU, wherein a data field of the OFDMA PPDU comprises a physical resource unit (RU) allocation mode, a logical RU allocation mode, and/or a hybrid RU allocation mode, an RU allocation mode subfield associated with the OFDMA PPDU indicates that one of the physical RU allocation mode, the logical RU allocation mode, and the hybrid RU allocation mode is used for the OFDMA PPDU. This can solve issues in the prior art, improve frequency diversity gain, reduce power consumption, achieve extremely high throughput (EHT), provide good communication performance, and/or provide high reliability.

In some embodiments, the OFDMA PPDU comprises an OFDMA extremely high throughput (EHT) PPDU or an OFDMA PPDU for a next generation IEEE 802.11 technology beyond institute of electrical and electronics engineer (IEEE) 802.11be. In some embodiments, the wireless communication method further comprises determining, by the AP, whether the OFDMA PPDU is used for downlink transmission or uplink transmission. In some embodiments, when the AP determines that the OFDMA PPDU is used for downlink transmission comprising a multi-user (MU) PPDU, a universal signal field (U-SIG) of the MU PPDU comprises the RU allocation mode subfield. In some embodiments, a bit position of the RU allocation mode subfield comprises two of B20, B21, B22, B23, B24, and B25 of U-SIG-1, B2 of U-SIG-2, and B8 of U-SIG-2. In some embodiments, when the AP determines that the OFDMA PPDU is used for uplink transmission, a common information field of a trigger frame transmitted by the AP soliciting the OFDMA PPDU transmission comprises the RU allocation mode subfield. In some embodiments, a bit position of the RU allocation mode subfield comprises two of B56, B57, B58, B59, B60, B61, and B62 of the common information field.

In some embodiments, when the logical RU allocation mode is applied to the data field of the OFDMA PPDU, a logical RU or multiple resource unit (MRU) for the OFDMA PPDU comprises multiple logical subcarriers which are generated from physical subcarriers via a distributed tone mapping over a whole OFDMA PPDU bandwidth. In some embodiments, an operating bandwidth of each intended station (STA) of the OFDMA PPDU is not smaller than an OFDMA PPDU bandwidth. In some embodiments, a logical RU or MRU for the OFDMA PPDU comprises multiple logical subcarriers which are generated from physical subcarriers via a distributed tone mapping over each of 20 MHz subchannels in an OFDMA PPDU bandwidth. In some embodiments, an operating bandwidth of each intended STA of the OFDMA PPDU is smaller than or equal to the OFDMA PPDU bandwidth. In some embodiments, a logical RU or MRU for the OFDMA PPDU comprises multiple logical subcarriers which are generated from physical subcarriers via a distributed tone mapping over each of 80 MHz frequency subblocks in an OFDMA PPDU bandwidth. In some embodiments, an intended STA of the OFDMA PPDU is not a 20 MHz operating STA.

In some embodiments, a logical RU or MRU for the OFDMA PPDU comprises multiple logical subcarriers which are generated from physical subcarriers via a distributed tone mapping over each of 160 MHz frequency subblocks in an OFDMA PPDU bandwidth. In some embodiments, an intended STA of the OFDMA PPDU is neither a 20 MHz operating STA nor an 80 MHz operating STA. In some embodiments, when the hybrid RU allocation mode is applied to the data field of the OFDMA PPDU, an OFDMA PPDU bandwidth is divided into a physical RU allocation bandwidth and a logical RU allocation bandwidth. In some embodiments, the physical RU allocation bandwidth comprises one or more continuous 20 MHz subchannels in the OFDMA PPDU bandwidth comprising an edge 20 MHz subchannel while the logical RU allocation bandwidth comprises one or more remaining 20 MHz subchannels in the OFDMA PPDU bandwidth. In some embodiments, the physical RU allocation bandwidth is a half of the OFDMA PPDU bandwidth comprising an edge 20 MHz subchannel while the logical RU allocation bandwidth is the other half of the OFDMA PPDU bandwidth. In some embodiments, the physical RU allocation bandwidth is a quarter of the OFDMA PPDU bandwidth including an edge 20 MHz subchannel while the logical RU allocation bandwidth is remaining three quarters of the OFDMA PPDU bandwidth; or otherwise, the physical RU allocation bandwidth is three quarters of the OFDMA PPDU bandwidth including an edge 20 MHz subchannel while the logical RU allocation bandwidth is a remaining quarter of the OFDMA PPDU bandwidth.

In some embodiments, the wireless communication method further comprises determining, by the AP or the STA, whether the OFDMA PPDU is used for downlink transmission or uplink transmission. In some embodiments, when the AP determines that the OFDMA PPDU is used for downlink transmission comprising a MU PPDU, a U-SIG of the MU PPDU comprises a hybrid RU allocation pattern subfield. In some embodiments, the hybrid RU allocation pattern subfield indicates information regarding the OFDMA PPDU bandwidth divided into the physical RU allocation bandwidth and the logical RU allocation bandwidth. In some embodiments, a bit position of the hybrid RU allocation pattern subfield comprises three of B20, B21, B22, B23, B24, and B25 of U-SIG-1, B2 of U-SIG-2, and B8 of U-SIG-2. In some embodiments, when the AP or the STA determines the trigger frame and the OFDMA PPDU is used for uplink transmission, a common information field of a trigger frame transmitted by the AP soliciting the OFDMA PPDU transmission comprises a hybrid RU allocation pattern subfield. In some embodiments, the hybrid RU allocation pattern subfield indicates information regarding the OFDMA PPDU bandwidth divided into the physical RU allocation bandwidth and the logical RU allocation bandwidth. In some embodiments, a bit position of the hybrid RU allocation pattern subfield comprises three of B56, B57, B58, B59, B60, B61, and B62 of the common information field.

Some embodiments of the present disclosure can be adopted in peer to peer (PTP) communication. The phrase "PTP communication", as used herein, may relate to device-to-device communication over a wireless link ("peer-to-peer link") between devices. The PTP communication may include, for example, a Wi-Fi direct (WFD) communication, e.g., a WFD P2P communication, wireless communication over a direct link within a quality of service (QoS) basic service set (BSS), a tunneled direct-link setup (TDLS) link, a STA-to-STA communication in an independent basic service set (IBSS), or the like. Some demonstrative embodiments are described herein with respect to Wi-Fi communication. However, other embodiments may be implemented with respect to any other communication schemes, networks, standards, and/or protocols.

Commercial interests for some embodiments are as follows. 1. Solving issues in the prior art. 2. Improving frequency diversity gain. 3. Reducing power consumption. 4. Achieving extremely high throughput. 5. Providing a good communication performance. 6. Providing a high reliability. 6. Some embodiments of the present disclosure are used by chipset vendors, communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in communication specification and/or communication standards such as IEEE specification and/or IEEE standards create an end product. Some embodiments of the present disclosure propose technical mechanisms.

Figure 17:
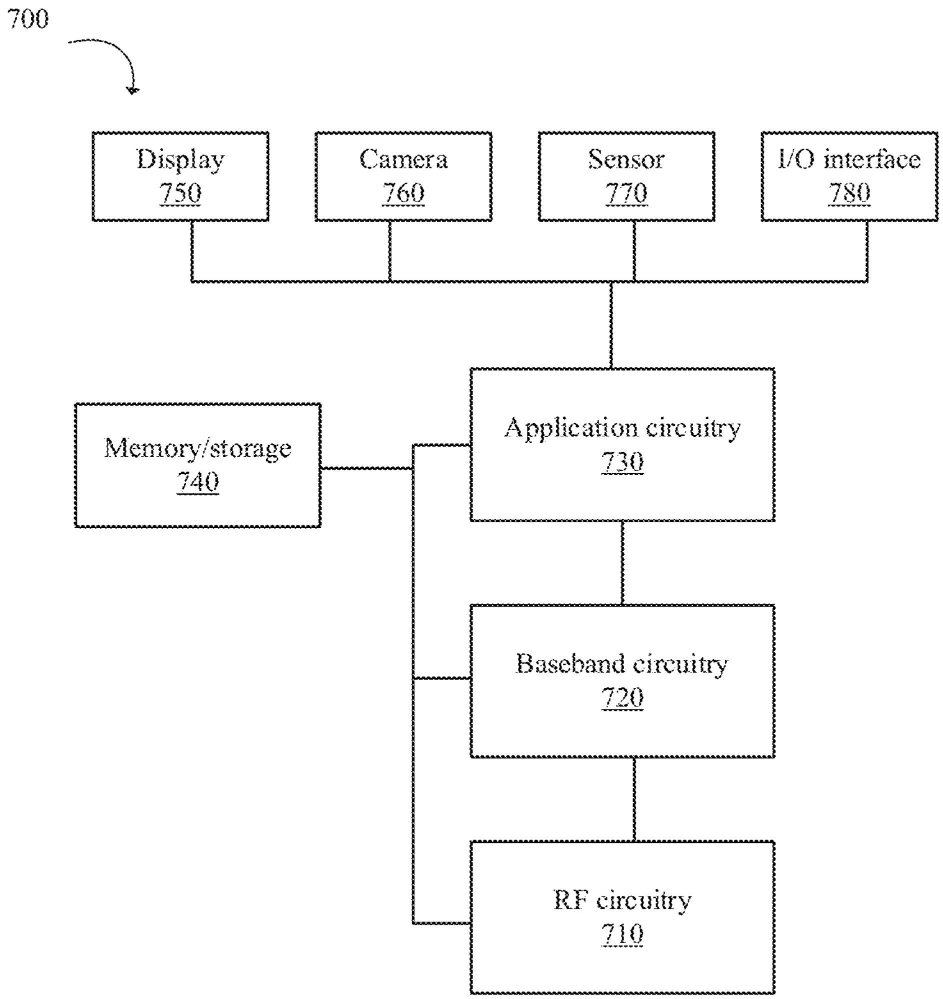
FIG. 17 is a block diagram of a system for wireless communication according to an embodiment of the present disclosure.

FIG. 17 is a block diagram of an example system 700 for wireless communication according to an embodiment of the present disclosure. Embodiments described herein may be implemented into the system using any suitably configured hardware and/or software. FIG. 17 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the AP or STA may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. An access point (AP), comprising a processor and a memory, wherein the memory is configured to store a computer program, and the processor is configured to invoke and run the computer program stored in the memory to cause the AP to perform:

determining a resource unit (RU) allocation mode for a data field of an orthogonal frequency division multiple access (OFDMA) physical layer protocol data unit (PPDU), wherein the OFDMA PPDU is a trigger based (TB) PPDU; and sending a trigger frame for soliciting transmission of the TB PPDU, wherein a first subfield of the trigger frame is a subfield for the RU allocation mode and two bits of the first subfield indicate which one of a physical RU allocation mode, a logical RU allocation mode, and a hybrid RU allocation mode is used for the solicited TB PPDU, bit positions of the two bits are B56 and B57 of a common information field of the trigger frame, wherein in the hybrid RU allocation mode, a PPDU bandwidth is divided into a physical RU allocation bandwidth and a logical RU allocation bandwidth, when the logical RU allocation mode is applied to the data field of the TB PPDU, a logical RU for the TB PPDU comprises multiple logical subcarriers which are generated from physical subcarriers via a distributed tone mapping over a whole TB PPDU bandwidth.

2. The AP of claim 1, wherein the TB PPDU comprises a TB PPDU for a next generation IEEE 802.11 technology beyond institute of electrical and electronics engineer (IEEE) 802.11be.

3. The AP of claim 1, wherein the processor is further configured to invoke and run the computer program stored in the memory to cause the AP to perform:

determining that the TB PPDU is used for uplink transmission.

4. The AP of claim 1, wherein the logical RU for the TB PPDU comprises multiple logical subcarriers which are generated from physical subcarriers via the distributed tone mapping over each of 80 MHz frequency subblocks in the TB PPDU bandwidth.

5. The AP of claim 1, wherein the physical RU allocation bandwidth is a half of the TB PPDU bandwidth comprising an edge 20 MHz subchannel while the logical RU allocation bandwidth is the other half of the TB PPDU bandwidth.

6. A station (STA), comprising a processor and a memory, wherein the memory is configured to store a computer program, and the processor is configured to invoke and run the computer program stored in the memory to cause the STA to perform:

receiving a trigger frame for soliciting transmission of a trigger based (TB) physical layer protocol data unit (PPDU), and determining according to the trigger frame, a resource unit, RU, allocation mode for a data field of an orthogonal frequency division multiple access (OFDMA) physical layer protocol data unit (PPDU), wherein the OFDMA PPDU is the TB PPDU, a first subfield of the trigger frame is a subfield for an RU allocation mode and two bits of the first subfield indicate which one of a physical RU allocation mode, a logical RU allocation mode, and a hybrid RU allocation mode is used for the solicited TB PPDU, bit positions of the two bits are B56 and B57 of a common information field of the trigger frame, wherein in the hybrid RU allocation mode, a PPDU bandwidth is divided into a physical RU allocation bandwidth and a logical RU allocation bandwidth, when the logical RU allocation mode is applied to the data field of the TB PPDU, a logical RU for the TB PPDU comprises multiple logical subcarriers which are generated from physical subcarriers via a distributed tone mapping over a whole TB PPDU bandwidth.

7. The STA of claim 6, wherein the TB PPDU comprises a TB PPDU for a next generation IEEE 802.11 technology beyond institute of electrical and electronics engineer (IEEE) 802.11be.

8. The STA of claim 6, wherein the processor is further configured to invoke and run the computer program stored in the memory to cause the STA to perform:

determining that the TB PPDU is used for uplink transmission.

9. The STA of claim 6, wherein the logical RU for the TB PPDU comprises multiple logical subcarriers which are generated from physical subcarriers via the distributed tone mapping over each of 80 MHz frequency subblocks in the TB PPDU bandwidth.

10. The STA of claim 6, wherein the physical RU allocation bandwidth is a half of the TB PPDU bandwidth comprising an edge 20 MHz subchannel while the logical RU allocation bandwidth is the other half of the TB PPDU bandwidth.

11. A wireless communication method by a station (STA), comprising:

receiving, by the STA, a trigger frame for soliciting transmission of a trigger based (TB) physical layer protocol data unit (PPDU), and determining, by the STA according to the trigger frame, a resource unit, RU, allocation mode for a data field of an orthogonal frequency division multiple access (OFDMA) physical layer protocol data unit (PPDU), wherein the OFDMA PPDU is the TB PPDU, a first subfield of the trigger frame is a subfield for an RU allocation mode and two bits of the first subfield indicate which one of a physical RU allocation mode, a logical RU allocation mode, and a hybrid RU allocation mode is used for the solicited TB PPDU, bit positions of the two bits are B56 and B57 of a common information field of the trigger frame, wherein in the hybrid RU allocation mode, a PPDU bandwidth is divided into a physical RU allocation bandwidth and a logical RU allocation bandwidth, when the logical RU allocation mode is applied to the data field of the TB PPDU, a logical RU for the TB PPDU comprises multiple logical subcarriers which are generated from physical subcarriers via a distributed tone mapping over a whole TB PPDU bandwidth.

12. The AP according to claim 1, wherein a value of the subfield for the RU allocation mode is set to 3, that is B56 and B57 are set to all 1 to indicate the physical RU allocation mode is used for the solicited TB PPDU; or a value of the subfield for the RU allocation mode is set to 0, that is B56 and B57 are set to all 0 to indicate the logical RU allocation mode is used for the solicited TB PPDU; or a value of the subfield for the RU allocation mode is set to 1 to indicate the hybrid RU allocation mode is used for the solicited TB PPDU.

13. The STA according to claim 6, wherein a value of the subfield for the RU allocation mode is set to 3, that is B56 and B57 are set to all 1 to indicate the physical RU allocation mode is used for the solicited TB PPDU; or a value of the subfield for the RU allocation mode is set to 0, that is B56 and B57 are set to all 0 to indicate the logical RU allocation mode is used for the solicited TB PPDU; or a value of the subfield for the RU allocation mode is set to 1 to indicate the hybrid RU allocation mode is used for the solicited TB PPDU.

14. The method of claim 11, wherein the TB PPDU comprises a TB PPDU for a next generation IEEE 802.11 technology beyond institute of electrical and electronics engineer (IEEE) 802.11be.

15. The method of claim 11, further comprising:

determining, by the STA, that the TB PPDU is used for uplink transmission.

16. The method of claim 11, wherein the logical RU for the TB PPDU comprises multiple logical subcarriers which are generated from physical subcarriers via the distributed tone mapping over each of 80 MHz frequency subblocks in the TB PPDU bandwidth.

17. The method of claim 11, wherein the physical RU allocation bandwidth is a half of the TB PPDU bandwidth comprising an edge 20 MHz subchannel while the logical RU allocation bandwidth is the other half of the TB PPDU bandwidth.

18. The method according to claim 11, wherein a value of the subfield for the RU allocation mode is set to 3, that is B56 and B57 are set to all 1 to indicate the physical RU allocation mode is used for the solicited TB PPDU; or a value of the subfield for the RU allocation mode is set to 0, that is B56 and B57 are set to all 0 to indicate the logical RU allocation mode is used for the solicited TB PPDU; or a value of the subfield for the RU allocation mode is set to 1 to indicate the hybrid RU allocation mode is used for the solicited TB PPDU.

* * * * *